United States Patent [19]
Yen

[11] Patent Number: 5,803,744
[45] Date of Patent: Sep. 8, 1998

[54] COMPUTER TYPING LEARNING DEVICE

[76] Inventor: Jung-Chuan Yen, No. 1, Lane 633, Sec. 1, Ching-Sha Street, Tainan, Taiwan

[21] Appl. No.: 877,178

[22] Filed: Jun. 17, 1997

[51] Int. Cl.[6] .................................................. B41J 29/12
[52] U.S. Cl. ........................... 434/227; 434/232; 400/714
[58] Field of Search .................................. 434/227, 231, 434/232; 400/714, 713

[56] References Cited

U.S. PATENT DOCUMENTS

| | | | |
|---|---|---|---|
| 4,671,688 | 6/1987 | Brashears | 400/714 |
| 5,096,317 | 3/1992 | Phillippe | 400/714 |
| 5,419,704 | 5/1995 | North | 434/227 |

*Primary Examiner*—Kien T. Nguyen
*Attorney, Agent, or Firm*—Rosenberg, Klein & Bilker

[57] ABSTRACT

A computer typing learning device includes a cover and a seat, and a key board combined electrically with with a screen disposed between the cover 1 and the seat. An electronic circuit board is provided under a base plate of the key board for arranging various circuits thereon for various functions to display typed letters on a exercise letter row of the screen to be compared with a reference letter row and a warning mark row to show which typed letter is wrong. The keyboard is structured as all the same as that for common computers. A solar cell module is also provided inside the cover, connected with a battery deposited in a battery chamber in the cover, and a power convert switch is fixed on the cover for selecting a power source AC or DC for the device.

5 Claims, 5 Drawing Sheets

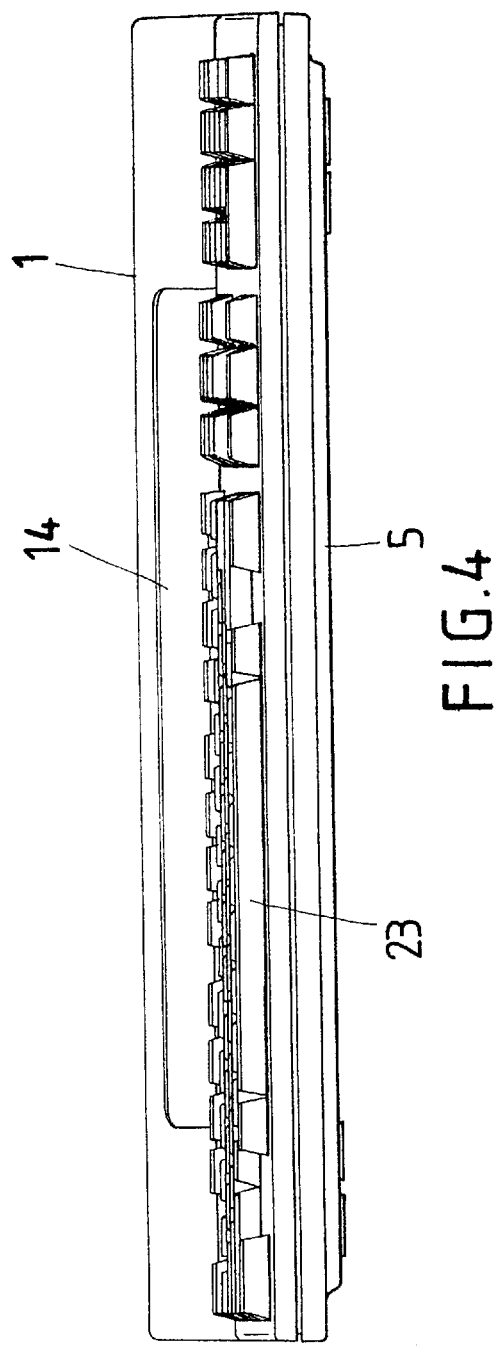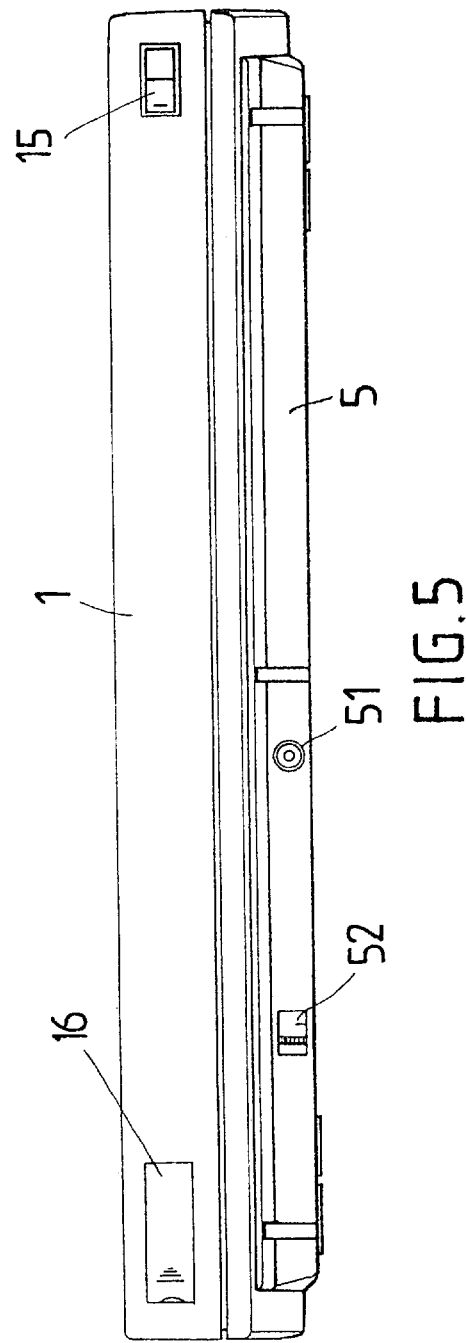

COMPUTER TYPING LEARNING DEVICE

BACKGROUND OF THE INVENTION

This invention relates to a computer typing learning device, particularly one light and handy to be portable.

If a person wants to type a key board of a computer with dexterity, he/she have to practice for a long time so as to place fingers on correct keys. After some letters are typed, those appeared on the screen of a terminal should be checked by a user to know typed letters correct or wrong. And typing speed should also be increased by practice as well.

But practicing typing with a common computer with a key board and a terminal is not so convenient, as they are commonly stationary, impossible to be carried to other places even if in need. Though notebook computers are available now, they are generally high priced, ineligible for common beginners, and in addition, they have different-sized keyboards from common computers. So most beginners may practice on a sheet of paper printed with the same key board position as that for a common computer, but this is not so effective because of lack in practical feeling.

SUMMARY OF THE INVENTION

The purpose of the invention is to offer a computer typing learning device having the same key board as that of a common computer.

A feature of the invention is an electronic circuit board, on which are arranged various circuits for displaying typed letters on a screen combined integral with a key board.

Another feature of the invention is a reference letter row, an exercise letter row and a warning mark row provided in the screen for displaying which typed letter is wrong for a user to check.

One more feature of the invention is a solar cell module provided in a cover on the key board, converting light into DC electricity to be charged in a battery to supply DC to the device, in addition to AC source usable to the device with a plug.

BRIEF DESCRIPTION OF DRAWINGS

This invention will be better understood by referring to the accompanying drawings, wherein:

FIG. 4 is a front view of the computer typing learning device, in the present invention;

FIG. 5 is a rear view of the computer typing learning device in the present invention; and, FIG. 6 is an upper view of a conventional computer keyboard.

DETAILED DESCRIPTION OF THE PREFERRED EMBODIMENT

Figure 1:
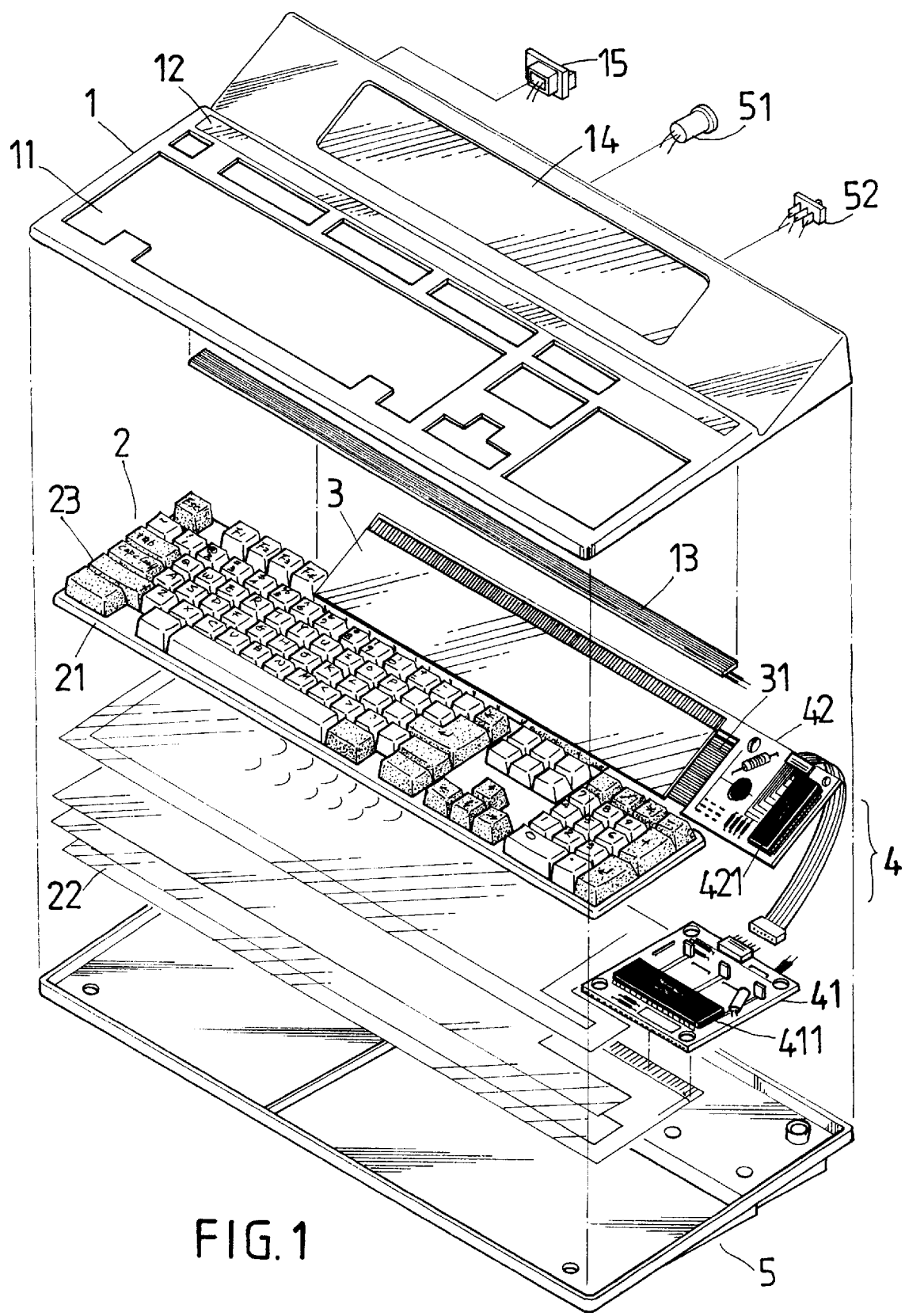
FIG. 1 is a perspective exploded view of a computer typing learning device in the present invention.

A preferred embodiment of a computer typing learning device in the present invention, as shown in FIG. 1, includes an cover 1, a key board 2, a screen 3, a circuit board 4 and a seat 5 combined together. The key board 2, the screen 3 and the circuit board 4 are disposed in the space formed between the cover 1 and the seat 5.

Referring to FIGS. 2–5, the cover 1 has a plurality of openings 11 in a front portion, and the openings 11 are arranged to have their size in relation with keys 23 of the key board 2, and a transparent section 12 for a solar cell module 13 to be fixed under it so that the solar cell module 13 may receive and transform light into electricity to be charged in a battery. Further, the cover 1 has a rear sloped-up portion, a transparent view window 14 provided in an upper surface, and the screen 3 is fixed under the view window 14 to let letters, figures and symbols shown on the screen to be seen through the view window 14. Further, a power switch 15 is fixed on a rear side for turning on and off the typing learning device and a battery chamber 16 is formed in the rear side for fitting in a battery as a DC power source for the device.

The key board 2 includes a plurality of keys 23 disposed on a base 21 just the same as the keys of a standard computer key board. The key board 2 further has a printed circuit board 22 under the base 2 connected with a signal transmitting and treating circuit board 41 so that the signals got by the printed circuit board 22 may be transmitted to the signal transmitting and treating circuit 41 for a CPU chip 411 to treat.

The screen 3 is a LCD screen for showing letters, figures and symbols and a reference letter row 31, an exercise letter row 32 and a warning mark row 33 to be displayed out. The screen 3 has its peripheral edge connected via lead wires 35 with the letter treating and producing circuit 42 of the circuit board 4, and gets cooperation from a CPU chip 421 therein. In practice, the reference row 31 is at first shown on the screen 3 when a key is pressed. And then the letter typed is shown in the exercise row 32. In case the typed letter is not the same as the reference row 31, i. e. wrong typing, then a warning mark such as an arrow head in the warning mark row 33 will appear if any wrong letters are typed, and a speaker 422 will simultaneously be sounded out, FIGS. 2 and 3 can be referred.

The circuit board 4 includes the signal transmitting and treating circuit board 41 and the letter treating and producing circuit board 42. The signal transmitting and treating circuit on the board 41 feeds data or command typed in to the letter treating and producing circuit on the board 42, which performs operation with with either ROM or RAM and sends out its result to the screen 3, which then displays out result. As to the circuit contained in the circuit board 4 and the typing exercise programs are not included in the claim, and the circuit is also a well-known art, omitted here in their description.

Figure 2:
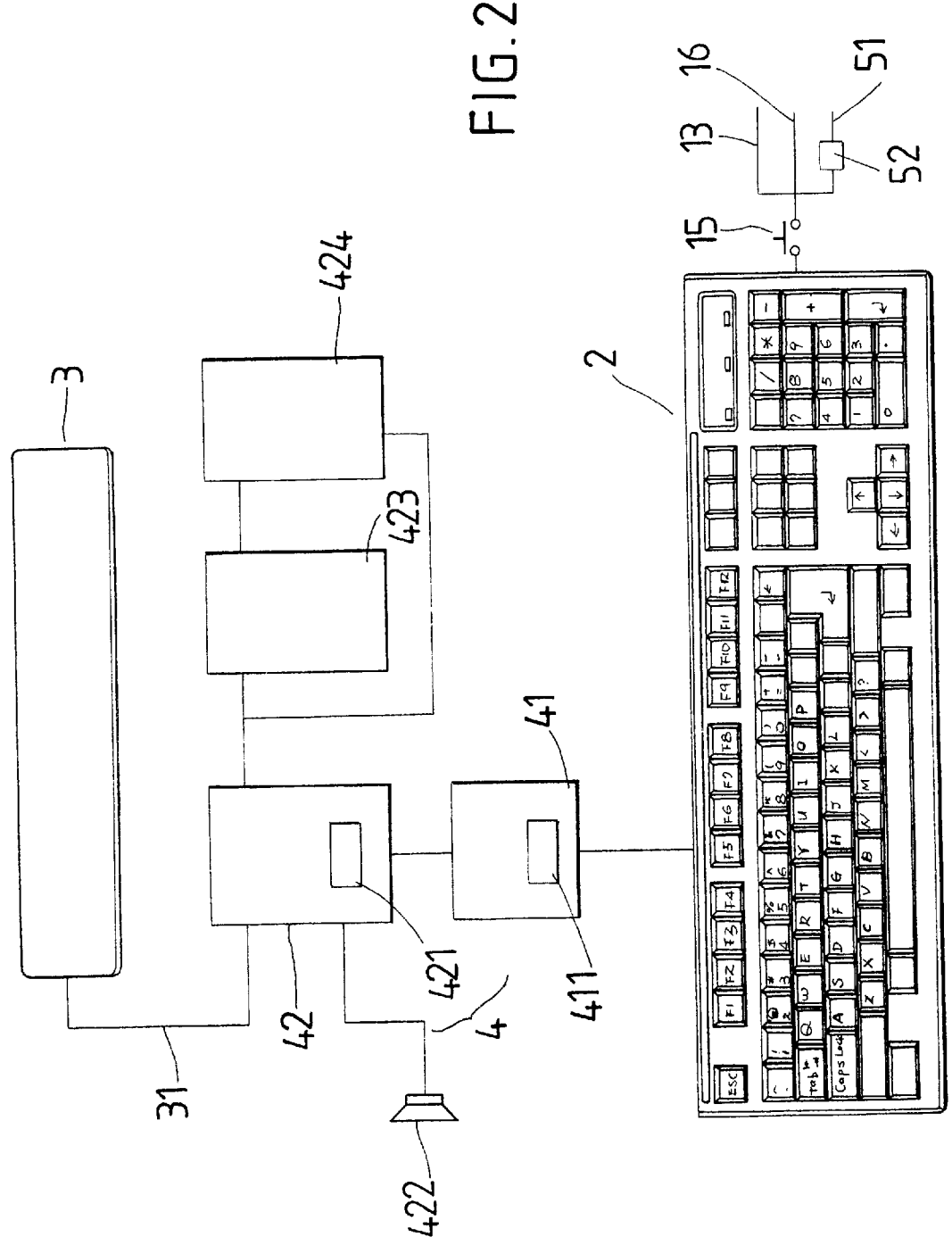
FIG. 2 is a block diagram of the computer typing learning device in the present invention.
Figure 3:
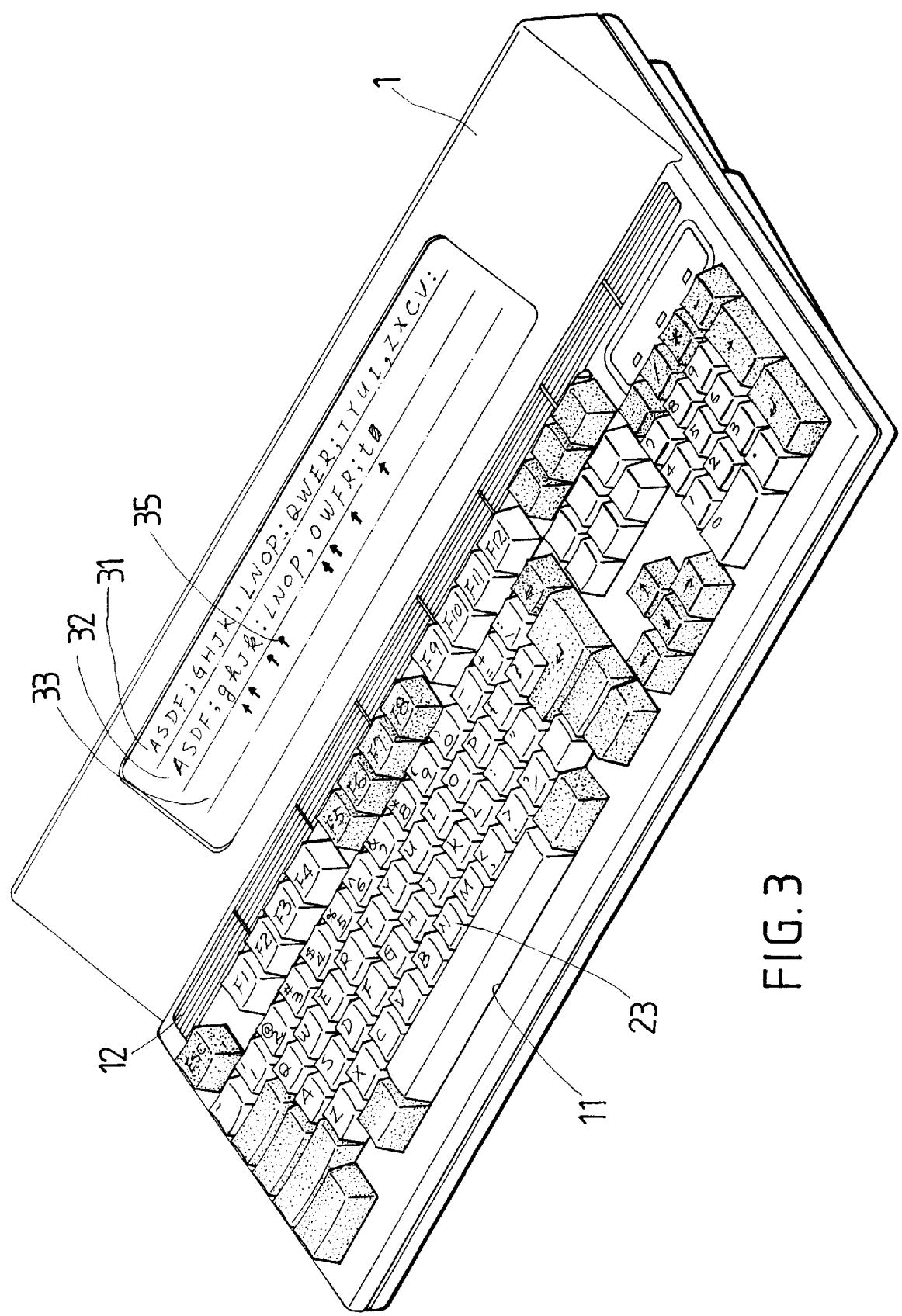
FIG. 3 is a perspective view of the computer typing learning device in the present invention.
Figure 6:
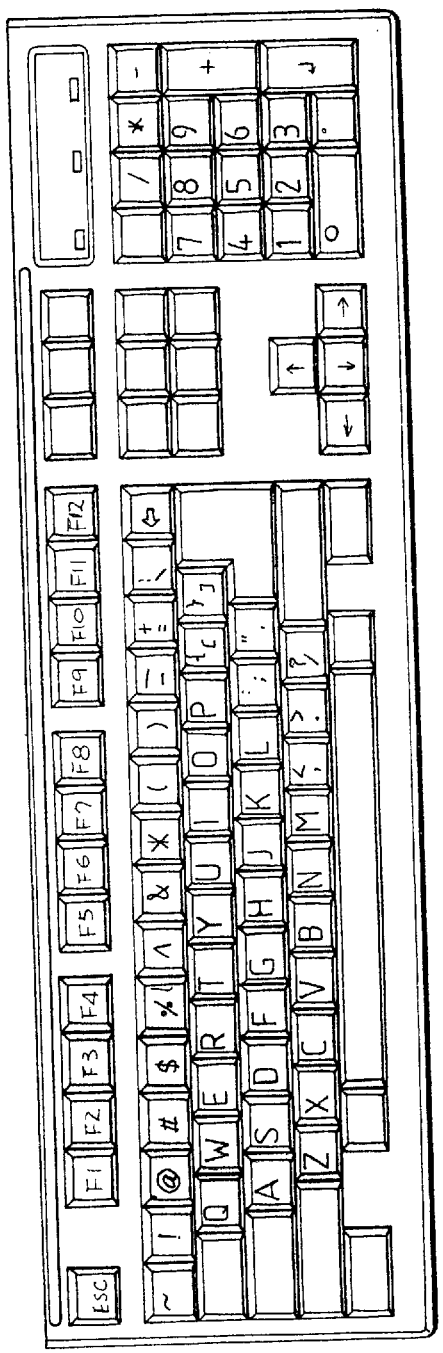

The seat 5 is to be covered on by the cover 1, having a plug 51 and a power converting switch 52, with with FIGS. 2 and 5 referred. The plug 51 is used to be connected with an outlet of alternate current, and the power converting switch 52 is handled to connect DC from a battery or AC with the learning device.

In learning typing with the learning device, the power converting switch 52 is handled to select power source, a. c. or d. c., with the power switch 15 is turned on. Then the circuit of the circuit board 4 automatically decide the power to be AC or DC. Then a beginner may start to exercise typing, by first pressing the function key of the reference letter row 31, and the keys 23 to send a signal produced by the print circuit board 22 to the signal transmitting and treating circuit board 41. Then the signal transmitting and treating circuit board 41 treats the data in a first step, transmitting the treated data via lead wires to the letter treating and producing circuit board 42, which then performs operation with ROM 423, RAM 424, and CPU 411 and 421. Then as soon as the data is treated, it will be displayed in the exercise letter row 32 so that the beginner may see which letter(s) he/she has typed is wrong, and at the same time, the warning mark row 33 appear to indicate wrongly typed letters, with the speaker 422 sounding out synchronously a warning to the user.

As can be understood from the aforesaid description of the invention has the following advantages.

1. It has a light weight, very convenient to be carried out.

2. It occupies a small space, handy to be used almost anywhere.

3. It has a simple function to perform, not so complicated as a common computer, with only a little components, resulting in a cheap cost.

4. It has a key board all the same as that used in common computers, enabling beginners to exercise in the same way as in practical use of a computer, without negative influence to subsequent practical operation of a computer.

While the preferred embodiment of the invention has been described above, it will be recognized and understood that various modifications may be made therein and the appended claims are intended to cover all such modifications which may fall within the spirit and scope of the invention.

What is claimed is:

1. A computer typing learning device, comprising:

a cover having a plurality of openings in a front portion in relation with keys of a key board;

said key board having a base plate, a plurality of keys arranged on said base plate in the same way and size as a standard keyboard, a printed circuit board fixed under said base plate and having its printed circuit connected with a circuit of a signal transmitting and treating circuit board;

a seat being covered by said cover to form a hollow space for disposing said key board and an electronic circuit board therein; and, characterized by said cover provided with a view window in a rear sloped up portion for a screen to be fixed under it, said screen connected via lead wires with a letter treating and producing circuit board, which includes two CPU a ROM and a RAM for performing operation to a signal coming from said keys of said keyboard, said letter treating and producing circuit feeding result treated to said screen 3, said screen displaying letters, figures and symbols typed to compare with an reference letter row, without need to use a common computer and a large terminal.

2. The computer typing learning device as claimed in claim 1, wherein said screen is an LCD screen of a proper size, able to display a reference letter row, an exercise letter row, and a warning mark row, having its peripheral edge connected via lead wires with said letter treating and producing circuit board of said circuit board, said letter treating and producing circuit board including a CPU, said reference letter row at first displayed on said screen 3 when its function key is pressed by a user (beginner), then letters treated displayed in said exercise letter row, warning symbols displayed in said warning mark row in case letters are wrongly typed, and a speaker sounding out a warning at the same time.

3. The computer typing learning device as claimed in claim 1, wherein said cover is formed with a battery chamber for depositing a battery as a DC power source for said learning device.

4. The computer typing learning device as claimed in claim 1, wherein a power plug is attached with said computer typing learning device, for connecting said learning device with an AC power source when said device is used in a room.

5. The computer typing learning device as claimed in claim 1, wherein a solar cell module is fixed under said transparent upper section connected with said battery deposited in said battery chamber so as to converting light into DC electricity to be charged in said battery, which serves as a DC power source of said computer typing learning device.

* * * * *